Oct. 26, 1926.
A. E. DRISSNER ET AL
1,604,113
METAL WORKING MACHINE
Filed July 18, 1923  2 Sheets-Sheet 2
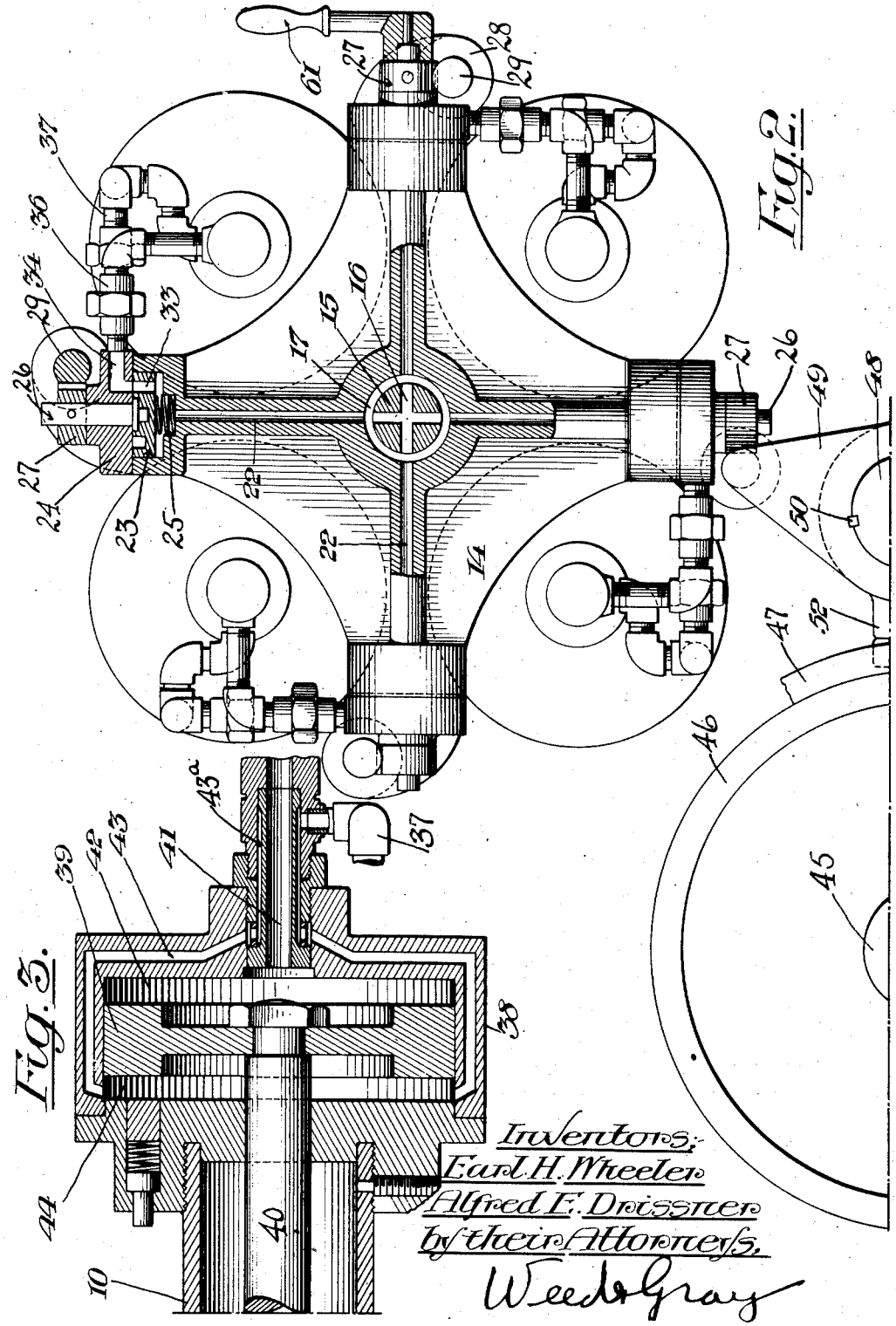

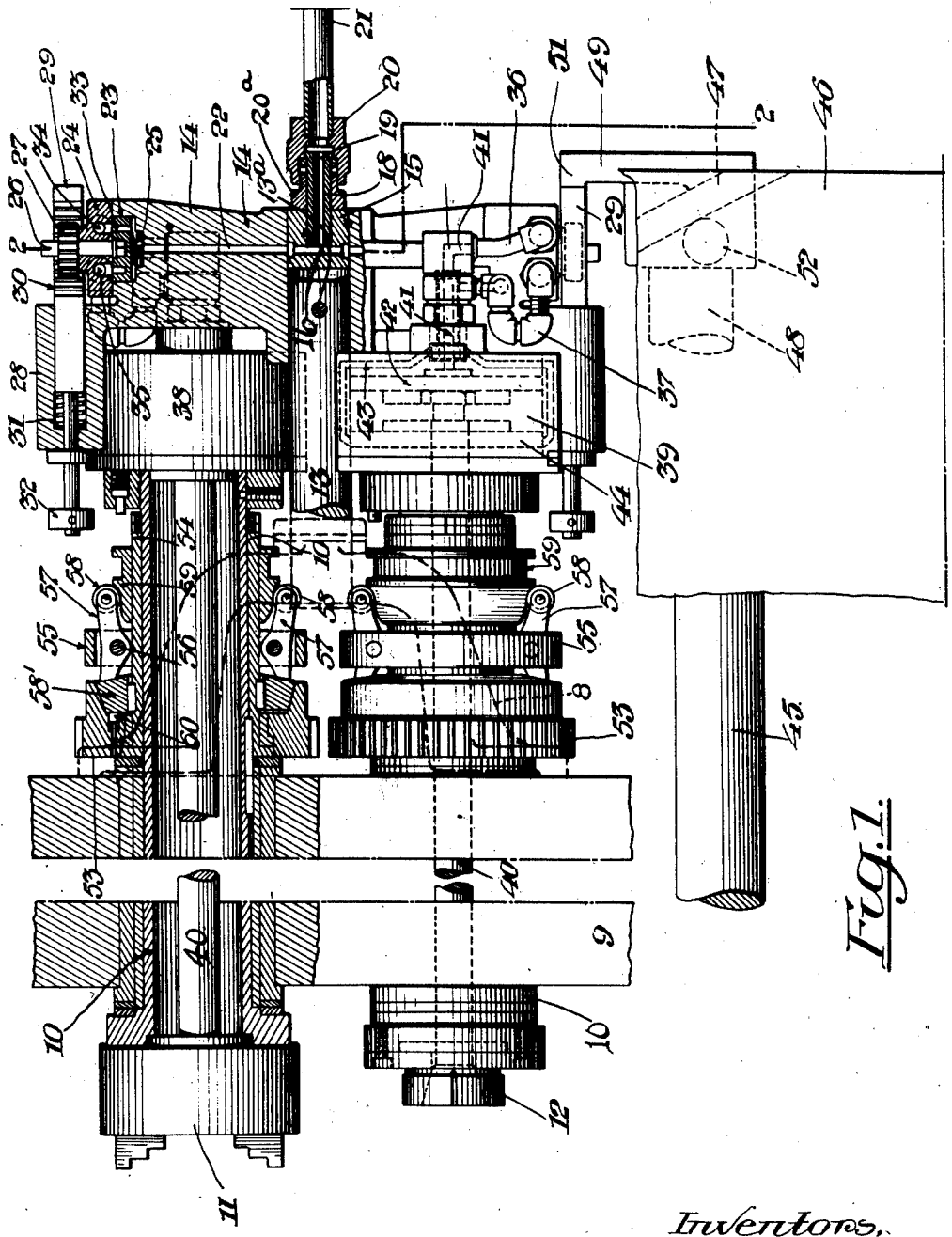

Patented Oct. 26, 1926.

1,604,113

UNITED STATES PATENT OFFICE.

ALFRED E. DRISSNER, OF CLEVELAND, OHIO, AND EARL H. WHEELER, OF WINDSOR, VERMONT, ASSIGNORS TO THE NATIONAL ACME COMPANY, OF CLEVELAND, OHIO, A CORPORATION OF OHIO.

METAL-WORKING MACHINE.

Application filed July 18, 1923. Serial No. 652,221.

This invention relates to metal working machines, and more particularly to multiple spindle machines, automatic screw machines, lathes, etc., an object of the invention being to provide an improved machine of this class in which a plurality of indexible hollow work spindles are provided with fluid operated means and which said fluid operated means is controlled by valve mechanism, one for each spindle and which valve mechanism is both manually controlled and also automatically controlled in sequence on the indexing of the spindles.

A further object of this invention is to provide an improved machine comprising a spindle carrier having a plurality of spindles provided with a plurality of chucks, and wherein a plurality of air controlled means are provided for operating the chucks usually in sequence, such means having a main conduit for conducting the air to the several means for operating the chucks.

A further object of this invention is to provide an air controlled chucking mechanism for opening and closing a chuck or a plurality of chucks, and also to provide a cam operated valve for controlling the flow of air through the medium of which the chucks are operated.

Other objects of this invention will appear in the following description and appended claims, reference being had to the accompanying drawings forming a part of this specification, wherein like reference characters indicate corresponding parts in the several views and wherein Fig. 1 is a side elevation partly in section illustrating a multiple spindle screw machine embodying my invention; Fig. 2 is an enlarged transverse section taken substantially on line 2—2 of Fig. 1; and Fig. 3 is a longitudinal section taken through the piston cylinder and inlet conduits.

Before explaining in detail the present improvement and mode of operation thereof, we desire to have it understood that the invention is not limited to the details of construction and arrangement of parts which are illustrated in the accompanying drawings, since the invention is capable of other embodiments, and that the phraseology which we employ is for the purpose of description and not of limitation.

The present invention is shown as applied to a Gridley multiple spindle automatic screw machine manufactured by the National Acme Company, but it will be understood that the invention is adapted to be used in various types of metal working machines and particularly to various types of multiple spindle machines. The construction in general comprises a plurality of spindles mounted in an indexing turret or spindle carrier, a plurality of chucks carried by the spindles, means for rotating the spindles, means for stopping each spindle independently of the other spindles, fluid or air controlled mechanism for each spindle and adapted to open and close the chuck thereof, valve mechanism for controlling the flow of fluid or air to said mechanism, means operated by a cam which is driven by the cam shaft of the machine for successively operating said valve mechanisms as they are brought into position by the indexing of the turret, and a single main conduit for conducting the fluid or air to the valve mechanisms. The mechanism of the invention is automatically operated, but the construction is such that any of the chucks can be operated through a hand control for the fluid pressure means. The invention is particularly adapted for operating the chucks of a plurality of spindles, and it has been found in practice that this improvement results in a more efficient operation of the chucks, in increasing the production, and in materially decreasing the cost of production.

In the drawings we have illustrated only such parts of the machine as are necessary for a clear understanding of the invention, and the machine herein shown in part may be constructed in accordance with the patent to Drissner, et al., No. 1,320,609, dated November 4, 1919, and assigned to the National Acme Company, assignee of the present invention.

In the drawings wherein we have illustrated a present preferred form of our invention, it will be seen that the cylinder, turret, or spindle carrier 9 supports in any suitable manner a plurality of spindles 10, four being herein shown by way of example, which are equally spaced from the axis of the cylinder. Each of the spindles 10 is provided with a suitable chuck, and in the present instance, by way of example, an external chuck 11 is connected to one of the spindles, and an internal chuck 12 is connected to another spindle. Suitably mounted on the turret 9 is a bracket 8 to which is secured one end of a shaft 13. Upon the opposite end of the shaft 13 is mounted a bracket or carrier 14, which is pinned at 13ᵃ to the shaft. The bracket 14 is provided with valve mechanism for controlling the flow of air or fluid to the means for operating each chuck. This bracket is bored axially, not only to receive the end of the spindle driving shaft 13, but also to receive a plug 15 which is placed and securely held in the rear end of this axial bore. The plug 15 as clearly shown in Fig. 2 is provided with four holes or passages 16 extending radially from the center of the plug, which communicate with a circumferential or circular passage 17 in the bracket 14. The plug 15 is also drilled to receive a bushing 18, which bushing is drilled lengthwise thereof to provide a passage 19 extending from one end to the other and communicating with pasages 16. Upon the outer end of the bushing 18 is mounted any suitable coupling device 20, 20ᵃ for connecting the bushing with an inlet pipe line 21.

The bracket 14 is drilled to provide a plurality or radially extending holes or passages 22, the number of these passages depending upon the number of spindles, and each passage communicating with the circumferential passage 17 and also extending outwardly to communicate with the several valve mechanisms. Since all of the valve mechanisms or units for the several spindles are herein identical, it will be sufficient to described one only.

The bracket 14 is counterbored at its outer end to receive an air valve member 23, and an air valve cap 24 is secured to the outer part of the bracket and over the valve 23. The valve member 23 rests upon a spring 25 which holds the same in position against the cap 24.

A shaft 26 extends through the valve cap 24, and is provided with a squared end secured to the valve member 23, the opposite squared end thereof having secured thereto a fan gear 27. The bracket 14 is provided with an extended portion 28 which is suitably bored to receive a plunger 29, one end of which is milled flat and a gear rack 30 is machined thereon, the teeth of which mesh with the teeth of gear 27. A spring 31 is located in the bore, which receives the plunger 29 and abuts against a shoulder of the plunger. A collar 32 is pinned to the end of the plunger 29.

The valve member 23 is provided with a passage 33 extending therethrough and communicating with the passage 22. The valve cap 24 is provided with two air passages 34 and 35 and it will be seen that upon rotating the valve member 23, the passage 33 may be brought into position to communicate with either passage 34 or 35. A suitable pipe line 36 is connected to the valve cap member 24 so as to communicate with the passage 34 and leads to the air cylinder, and a suitable pipe line 37 is also connected to the valve member 24 so as to communicate with passage 35 and also leads to the air cylinder.

Suitably mounted upon the rear end of each spindle 10, is a fluid or air chamber or cylinder 38. Within each cylinder 38 is located a disk or piston 39 which is adapted to reciprocate therein. Each piston has a piston extension extending into the hollow spindle or tube 10 and terminates in a stock engaging member, and in the present instance this piston extension comprises an operating member 40 connected to a chuck 11 or 12.

From the pipe line 36, a suitable air channel or passage 41 extends into the cylinder 39 and into a chamber 42 at one side of the piston 39. From the pipe line 37, passages or ducts 43ᵃ, 43 extend around the piston 39 and communicate with an air chamber 44 at the opposite side of the piston 39. From this construction it will be seen that by directing air under pressure through pipe line 36 and through the passage or duct 41 into chamber 42, the piston 39 will be shifted forwardly, thus shifting the member 40 and operating the chuck. On the other hand, by directing air under pressure through pipe line 37 and thence through passages 43ᵃ and 43, into chamber 44 the piston 39 will be shifted in the opposite direction, thus retracting member 40 and operating the chuck Mounted upon the cam shaft 45 is a cam drum 46 provided with a suitable cam 47 secured to the periphery thereof. A shaft 48 is mounted and securely held in the bed of the machine against turning, and on the end of this shaft is located a pusher bracket 49, the bracket 49 being keyed at 50 to shaft 48 so as to slide freely thereon. The purpose of the key 50 is to keep the bracket 49 from turning so that when the turret 9 is indexed the plunger 29 and the working end 51 of the bracket are always brought into alinement. A cam roller 52 is suitably mounted upon bracket 49 and is adapted to be engaged by the cam 47.

The construction and shape of the cam 47 is such that at the desired moment just after the indexing of turret 9, the cam will shift the bracket 49 through the medium of roller 52, and since the end 51 of the bracket engages the end of plunger 29, the latter will be shifted forwardly compressing the spring 31. Since the plunger is in the form of a rack this movement thereof will rotate the gear 27 which will rotate valve member 23. With the valve 23 in the position shown in Figs. 1 and 2 air will be admitted from the single main inlet conduit 21 through passages 19, 16, 17 and 22, and will pass through passage 33 of the valve, passage 34 of the valve cap 24, through pipe 36 and passage 41 into the chamber 42. The air acting upon piston 39 will force chuck operating member 40 forwardly, and in the present instance open the chuck to release the work. At this point the spindle 10 from which the work is to be removed, is stopped by clutch means hereinafter described, whereupon the operator removes the finished work and places a new piece in the chuck, or both of these operations may be accomplished automatically by means of suitable feeding and ejecting means.

When the new piece of work has been fed or placed in the chuck, the cam 47 releases the roller 52 and the spring 31 forces the plunger or rack 29 rearwardly, rotating the gear 27, and also rotating the valve member 23 so as to bring air passage 33 into communication with passage 35 in the valve cap 24. At this time therefore, the air passes through the valve into passage 35, through pipe line 37, passages 43ª and 43, and into air chamber 44. The air acting in rear of the piston 39 will force the same with chuck operating member 40 rearwardly and cause the chuck to grip the work.

Each of the spindles 10 is rotated by means of a gear 53, and the several gears of the spindles are simultaneously driven by means of a center gear (not shown) which is mounted upon the spindle driving shaft of the machine, the construction of which may be substantially the same as shown in the above mentioned patent. Mounted upon the spindle 10 is a sleeve 54, and secured to the sleeve 54 by means of suitable threads is a finger holder 55. Pivoted at 56 to the finger holder 55 are a pair of fingers or levers 57 carrying rollers 58 at their outer ends which are adapted to be engaged by the wedge faces of a sliding wedge 59. This wedge is preferably operated automatically from the cam shaft and when shifted to the position shown in Fig. 1, the fingers or levers 57 will force friction ring 58', which is keyed to sleeve 54, into frictional engagement with a tapered face of the gear member 53. In this position of the clutch, the gear will be connected to the spindle 10 and will rotate the same. Upon shifting the wedge 59 in the opposite direction the friction clutch ring 58' will be forced away from the gear member by means of spring plungers 60, thus disconnecting the gear from the spindle and stopping the same. It will be understood that the wedge spool 59 may be operated on the spindle either manually or automatically from the cam shaft.

Each valve mechanism for each spindle may be controlled if desired, at any time by connecting the hand lever 61 to the squared outer end of the shaft 26, and by manipulating the lever 61 the gear 27 may be rotated in order to adjust the valve mechanism.

It will be particularly noted that the machine is so timed that when the chucking mechanism of one of the spindles, after the indexing of the turret, is being operated in order to release the work and permit a new piece of work to be inserted, the spindle 10 which carries such chuck will be stopped independently of the other spindles. This is done automatically through the friction clutch mechanism, and avoids the necessity of stopping the entire machine during the chucking operation on one of the spindles.

It is to be understood that by describing in detail herein any particular form, structure, or arrangement, it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. In a metal working machine, the combination of an indexible spindle carrier, means for indexing the carrier, a plurality of hollow spindles carried by said carrier, a shiftable stock engaging member in each spindle, fluid pressure means for shifting each stock engaging member axially of its spindle in opposite directions, an individual shiftable valve for each spindle for controlling said fluid pressure means, and a rotary cam shaft having cam means for directly engaging and automatically operating each of said valves in sequence on the indexing of the carrier into position to bring each of said valves into cooperative relation with said cam means.

2. In a metal working machine, the combination of an indexible spindle carrier, means for indexing the carrier, a plurality of hollow spindles carried by said carrier, a shiftable work engaging member in each spindle, a carrier located in the rear of said spindle carrier and indexible therewith, fluid pressure operated means located between said carriers for shifting said work engaging members, valve mechanism for controlling said fluid pressure means, and means for operating said valve mechanism in sequence on the indexing of the carrier.

3. In a metal working machine, the combination of an indexible spindle carrier, means for indexing it, a series of hollow work spindles carried by said carrier, a reciprocating member in each of said work spindles, a piston connected with each of said reciprocating members, fluid pressure means for successively reciprocating said pistons, independent valve mechanism for each of said work spindles for controlling said fluid pressure means, means for automatically operating each of said valve mechanisms in sequence on the indexing of the carrier, and independent hand operated means for each of said valve mechanisms for also controlling said fluid pressure means.

4. In a metal working machine, the combination of an indexible turret, a plurality of hollow spindles carried thereby, a reciprocating work engaging member in each spindle, a reciprocating piston connected to each member, valve means for each piston and having a shiftable operating member, a rotary cam shaft, a central fluid conduit, conduits connecting said conduit with said valve means and indexible with the turret, and cam means carried by said cam shaft for shifting each operating member successively upon indexing the turret.

5. In a metal working machine, the combination of an indexible spindle carrier, a series of circularly located hollow work spindles carried by said carrier, a reciprocating member in each of said work spindles, a piston connected with each of said reciprocating members, fluid pressure means for successively reciprocating said pistons, and automatically operative cam mechanism for controlling said fluid pressure means in sequence upon indexing the turret.

6. In a metal working machine, the combination of an indexible turret, a plurality of hollow spindles carried thereby, a reciprocating work engaging member in each spindle, a reciprocating piston connected to each member, valve means for each piston and having a pair of operating members, a rotary cam shaft, and cam means carried thereby and movable into position to shift one of each pair of operating members successively upon indexing the turret, the other operating member of each pair being manually controllable.

7. In a metal working machine, the combination of an indexible spindle carrier, means for indexing it, a plurality of hollow work spindles carried by said carrier, a reciprocating member in each spindle, means for reciprocating said member and including a piston, fluid pressure means for shifting said pistons, valve mechanism for controlling said fluid pressure means, hand operated means for controlling said valve mechanism, and means for automatically operating said valve mechanism in sequence on the indexing of the carrier.

8. In a metal working machine, the combination of an indexible spindle carrier, a plurality of spindles carried thereby and extending rearwardly thereof, a second indexible carrier located in rear of said spindles, a shiftable work-engaging member in each spindle, fluid pressure means for shifting the same, valve mechanism for controlling said fluid pressure means and carried by said second carrier.

9. In a metal working machine, the combination of an indexible spindle carrier, a plurality of spindles carried thereby and extending rearwardly thereof, a second indexible carrier located in rear of said spindles, a shiftable work-engaging member in each spindle, fluid pressure means for shifting the same, valve means for each spindle carried by said second carrier for controlling said fluid pressure means, and a common fluid inlet for said valve means and terminating axially of said second carrier.

10. In a metal working machine, the combination of an indexible spindle carrier, a plurality of spindles carried thereby and extending rearwardly thereof, a second indexible carrier located in rear of said spindles, a shiftable work-engaging member in each spindle, fluid pressure means for shifting the same, valve means for each spindle carried by said second carrier for controlling said fluid pressure means, and cam operated means for successively operating said valve means upon indexing the turret.

11. The combination of an indexible turret, a plurality of spindles carried thereby, a chuck for each spindle, a shaft fixed to said turret and projecting therefrom, a support secured to said shaft and having a plurality of laterally projecting arms, valve mechanism carried by each arm, fluid operated means connecting each valve mechanism with a chuck, and conduits in said support for conducting fluid to each valve mechanism.

12. The combination of an indexible turret, a plurality of spindles carried thereby, a chuck for each spindle, a shaft fixed to said turret and projecting therefrom, a support secured to said shaft and having a plurality of laterally projecting arms, valve mechanism carried by each arm, fluid operated means connecting each valve mechanism with a chuck, conduits in said support for conducting fluid to each valve mechanism, and cam means timed to successively operate said valve mechanism upon indexing the turret.

13. In a metal working machine, the combination of an indexible spindle carrier, a plurality of spindles carried thereby and extending rearwardly thereof, a second indexible carrier, located in rear of said spindles, a shiftable work-engaging member in each spindle, fluid pressure means for shifting the same, valve means for each spindle carried by said second carrier for controlling said fluid pressure means, a common fluid inlet for said valve means and terminating axially of said second carrier, and a conduit carried by said second carrier and connecting said inlet with each valve means.

14. In a metal working machine, the combination of an indexible spindle carrier, a plurality of spindles carried thereby, a second carrier spaced from said spindle carrier, a shaft connecting said carriers to cause the second carrier to index with the spindle carrier, a work engaging member in each spindle, fluid pressure means for shifting each member and including valve mechanism carried by said second carrier.

15. In a metal working machine, the combination of an indexible spindle carrier, a plurality of spindles carried thereby, a second carrier spaced from said spindle carrier, a shaft connecting said carriers to cause the second carrier to index with the spindle carrier, a work engaging member in each spindle, fluid pressure means for shifting each member and including valve mechanism carried by said second carrier, and mechanism between said carriers for rotating said spindles.

16. In a metal working machine, the combination of an indexible spindle carrier, a plurality of spindles carried thereby, a second carrier spaced from said spindle carrier, a shaft connecting said carriers to cause the second carrier to index with the spindle carrier, a work engaging member in each spindle, fluid pressure means for shifting each member and including valve mechanism carried by said second carrier, and a central fluid conduit connected axially of said second carrier and communicating with said valve mechanism.

17. In a metal working machine, the combination of an indexible spindle carrier, means for indexing the carrier, a plurality of hollow spindles carried thereby, a shiftable work engaging member in each spindle, a second carrier connected to said spindle carrier and indexible therewith, fluid operated means located between said carriers for shifting said work engaging members, valve mechanism carried by said second carrier, hand controlled operating means for said valve mechanism, and means for automatically operating said valve mechanism in sequence on the indexing of the carrier.

18. In a metal working machine, the combination of an indexible turret having a plurality of hollow spindles, a reciprocating member extending thru each spindle, a reciprocating piston connected to each member, fluid pressure means for reciprocating said piston and including valve means for each piston, a cam shaft having a cam, a shiftable operating member permanently mounted in position to be successively engaged by said cam and also in position to operate each valve means successively upon indexing of the turret.

19. The combination of an indexible turret, a plurality of spindles carried thereby, a chuck carried by each spindle, a shaft secured to said turret, a bracket secured to said shaft, a plurality of fluid operated means carried by said bracket, and means for connecting each of said fluid operating means with a chuck for operating the same.

20. The combination of an indexible turret, a plurality of spindles carried thereby, a chuck carried by each spindle, a shaft secured to said turret, a bracket secured to said shaft, a plurality of fluid operated means carried by said bracket and each comprising valve mechanism, means for connecting each of said fluid operated means with a chuck for operating the same, and cam means for successively operating said valve mechanism upon indexing the turret.

21. In a metal working machine, the combination of an indexible turret, a plurality of hollow spindles carried thereby, a reciprocating work engaging member in each spindle, a reciprocating piston connected to each member, valve means for each piston and having a shiftable operating member, a cam shaft located below said turret, a cam carried thereby and movable into position to shift each operating member successively upon indexing the turret.

22. In a metal working machine, the combination of an indexible turret, a plurality of hollow work spindles carried thereby, a reciprocating member extending thru each spindle and having stock engaging means at one end and a piston at the opposite end, a pair of conduits for conducting fluid to opposite sides of each piston, a valve connected to each pair of conduits, a rotary cam shaft, a cam carried thereby and adapted to successively operate each valve upon indexing of the turret.

23. In a metal working machine, the combination of a spindle carrier, a plurality of hollow spindles carried thereby, a shiftable work engaging member in each spindle, fluid pressure means for shifting said work engaging members and including valve mechanism, said valve mechanism having manually shiftable operating means and cam shiftable operating means, a rotary cam shaft, and cam means carried thereby for shifting said second operating means.

24. In a metal working machine, the combination of an indexible spindle carrier, a plurality of horizontal work spindles carried thereby and extending rearwardly thereof, a shiftable stock engaging member in each spindle, fluid pressure means for shifting the same, a plurality of valves for controlling said last means and supported in rear of said carrier to index therewith, a central fluid inlet, and a plurality of conduits indexible with said carrier and connecting said inlet with said valves.

25. In a metal working machine, the combination of an indexible spindle carrier, a plurality of horizontal work spindles carried thereby and extending rearwardly thereof, a shiftable stock engaging member in each spindle, fluid pressure means for shifting the same, a plurality of valves for controlling said last means and supported in rear of said carrier to index therewith, a central fluid inlet, a plurality of conduits indexible with said carrier and connecting said inlet with said valves, manually operated means and automatically operated means for controlling each valve.

26. In a metal working machine, the combination of a plurality of hollow work spindles, a shiftable stock engaging member for each spindle, fluid pressure means for shifting each member axially of its spindle, valve mechanism for controlling said fluid means, manually operated means and cam operated means for controlling said valve mechanism.

27. In a metal working machine, the combination of a hollow work spindle, a shiftable stock engaging member therein, fluid pressure means for shifting said member and including a piston, a valve for controlling said fluid pressure means, and having a rotary operating member, a pair of means connected to said member for rotating the same, a rotary cam shaft, and a cam carried thereby and movable into position to operate one of said pair of means, the other of said pair of means being manually controllable.

28. In a metal working machine, the combination of an indexible spindle carrier, means for indexing the carrier, a plurality of hollow spindles carried by said carrier, a shiftable work engaging member in each spindle, a carrier located in the rear of said spindle carrier and indexible therewith, fluid pressure operated means located between said carriers for shifting said work engaging members, an independent valve mechanism for each of said spindles, means for automatically operating each of said valve mechanisms in sequence on the indexing of the carrier, and independent means for manually operating each of said valve mechanisms.

29. In a metal working machine, the combination of an indexible carrier, means for indexing the carrier, a plurality of hollow spindles or tubes extending into said carrier, a shiftable stock engaging member in each spindle, fluid pressure means for shifting each of said stock engaging members axially of its spindle in opposite directions, a plurality of shiftable valves one for controlling the admission of fluid to each spindle, and means for directly and automatically operating each of said valves in sequence on the indexing of the carrier.

30. In a metal working machine, the combination of an indexible spindle carrier, means for indexing the carrier, a plurality of hollow chuck carrying rotatable spindles carried by said carrier, means for rotating said spindles, a second carrier located in the rear of said spindle carrier and connected to and indexible with said spindle carrier, a shiftable chuck operating member located in each spindle, a piston chamber carried by each spindle between the carriers, a piston therein and connected with a chuck operating member and also with a source of fluid supply, valve mechanisms carried by said second carrier, one for each spindle, a cam shaft and cam means carried thereby for operating each of said valve mechanisms in sequence on the indexing of the carriers to operate the chucks, and means for also automatically operating the valve mechanisms in sequence on the indexing of the carriers to operate the chucks upon release of said cam means.

31. In a metal working machine, the combination of an indexible spindle carrier, means for indexing the carrier, a plurality of hollow chuck carrying rotatable spindles carried by said carrier, means for rotating said spindles, a second carrier located in the rear of said spindle carrier and connected to and indexible with said spindle carrier, a shiftable chuck operating member located in each spindle, a piston chamber carried by each spindle between the carriers, a piston therein and connected with a chuck operating member and also with a source of fluid supply, valve mechanisms carried by said second carrier, one for each spindle, a cam shaft and cam means carried thereby for operating each of said valve mechanisms in sequence on the indexing of the carriers to operate the chucks, means for also automatically operating the valve mechanisms in sequence on the indexing of the carriers to operate the chucks upon release of said cam means and manually controlled means for also operating the valve mechanisms.

32. In a metal working machine, the combination of indexible carriers, means for indexing said carriers, a plurality of hollow spindles or tubes extending into one of said carriers, a shiftable stock engaging member in each spindle, fluid pressure means for shifting each of said stock engaging members axially of its spindle in opposite directions, a plurality of shiftable valves, one for controlling the admission of fluid to each of said spindles, and means for directly and automatically operating each of said valves in sequence on the indexing of the carriers, said valves being located adjacent to the periphery of one of said cariers, said last carrier having communication centrally thereof with a source of fluid supply and also having radial communication therethrough with said valves.

Signed at Cleveland, Ohio, this 10th day of July, 1923.

ALFRED E. DRISSNER.

Signed at Windsor, Vermont, this 11th day of July, 1923.

EARL H. WHEELER.